March 9, 1926.                                                                  1,576,193
P. JOHN
LICENSE PLATE HOLDER
Filed Oct. 17, 1925
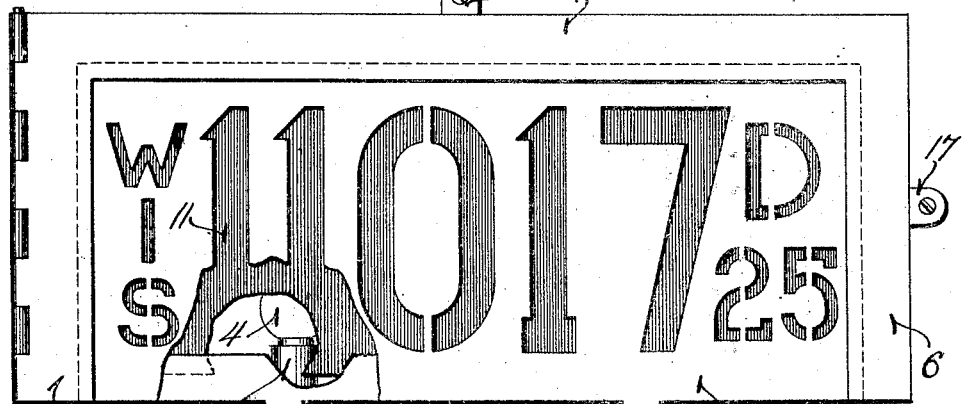
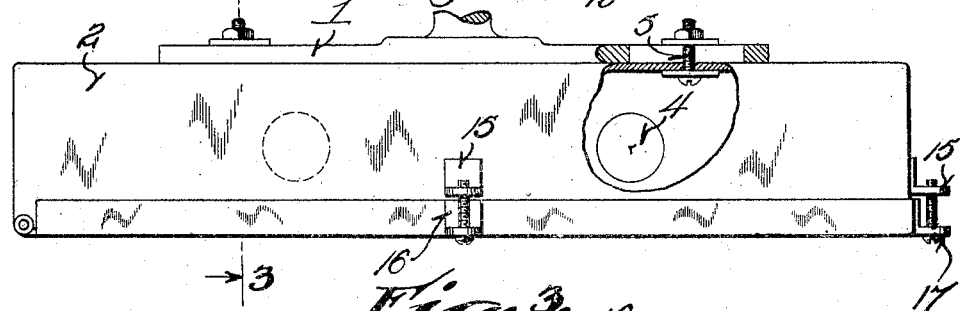
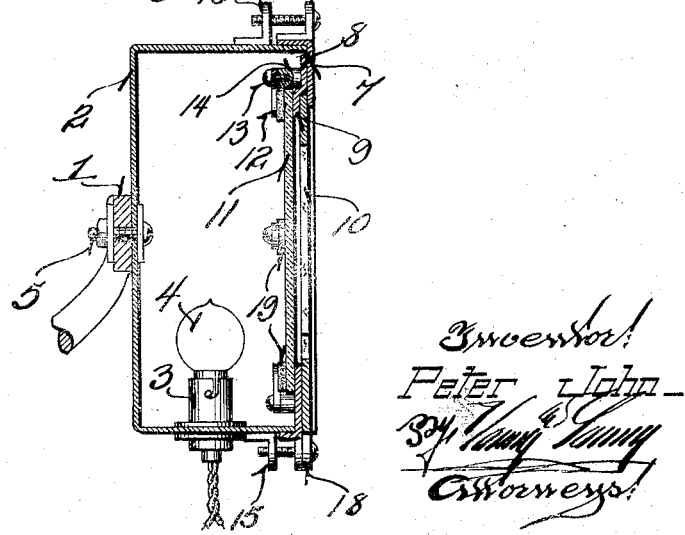

Patented Mar. 9, 1926.

1,576,193

UNITED STATES PATENT OFFICE.

PETER JOHN, OF MILWAUKEE, WISCONSIN.

LICENSE-PLATE HOLDER.

Application filed October 17, 1925. Serial No. 63,019.

*To all whom it may concern:*

Be it known that I, PETER JOHN, a citizen of the United States, and resident of Milwaukee, in the county of Milwaukee and State of Wisconsin, have invented certain new and useful Improvements in License-Plate Holders; and I do hereby declare that the following is a full, clear, and exact description thereof.

This invention relates to license plate holders.

Objects of this invention are to provide a novel form of license plate holder which may be attached to the ordinary bracket, and which may receive the license plate and illuminate such plate in a novel manner.

Further objects are to provide a license plate holder in which a stencilled or cutout license plate is employed, and in which the entire device may be used as a tail light for the automobile, thus dispensing with the usual tail light.

Further objects are to provide a construction in which rattling is prevented by tightly binding the parts together, and in which the lamps are housed and protected against damage.

An embodiment of the invention is shown in the accompanying drawings, in which:—

Figure 1 is a face view of the apparatus with parts broken away.

Figure 2 is a plan view of the structure shown in Figure 1, with parts broken away.

Figure 3 is a sectional view on the line 3—3 of Figure 2.

Referring to the drawings, it will be seen that the device is bolted to the usual bracket provided for the license plates, such bracket having a pair of outwardly projecting slotted arms 1, as shown in Figures 2 and 3.

The device comprises a box-like member 2 which is opened rearwardly and which is preferably enameled white on its inner side. This box-like member carries a pair of lamp sockets 3 within which lamps 4 are positioned. It is secured to the bracket 1 by means of bolts 5 which pass through the back of the box 2.

The cover portion of the box is formed preferably by means of side and top channel-shaped members 6 and 7, respectively. One of the members 6 may be hinged to the body of the box, as shown in Figures 1 and 2. The marginal portion, formed of the members 6 and 7, has secured thereto an inner strip 8 (see Fig. 3), which is welded thereto or otherwise secured, and which is pressed inwardly to form a flange 9 extending around the inner margins of the members 6 and 7 and spaced therefrom to receive the license plate 10. This license plate 10 is cutout to form the numbers and letters, as indicated in Figures 1 and 3. Immediately rearwardly of the flange 9 a glass plate, preferably colored red, is positioned and indicated at 11 in Figure 3. This glass plate is held in position by means of tongues or ears 12 secured by means of screws 13 to posts 14 projecting inwardly of the cover.

The body portion of the license plate holder carries a plurality of lugs 15 which are apertured and threaded to receive attaching screws passing through corresponding lugs in the cover.

It is to be noted from reference to Figures 2 and 3 that the cover is provided with an upper bracket 16 and with a bracket 17 at the outer or free end of the cover. These brackets are drawn inwardly by means of the screws indicated, towards the bracket 15. The lower edge of the license plate has depending therefrom a plurality of ears or brackets 18 through which screws are passed so as to tightly hold the license plate adjacent its lower edge to the bracket 15. In this manner, the license plate is held around its side and top edges between the flange 9 and the portions 6 and 7 of the cover, and is held at its lower edge by means of the ears 18.

All rattling is prevented by this construction as the parts are not only hinged together, but are held tightly by means of the adjustable screws. Further rattling or chipping of the colored glass plate 11 is prevented by means of pads 19 clamped between the ears 12 and the glass plate, so as to tightly hold the plate in position.

In using this license plate holder, it is intended to function not only to illuminate the license plate, but also to furnish a tail light.

It will be seen that a novel form of license plate holder has been provided which may be readily constructed primarily from sheet metal, in a simple manner, and which will provide an illuminated license plate readily visible at night and also which will function as a tail light.

Although the invention has been described in considerable detail, it is to be understood that the invention may be variously embodied and is, therefore, to be limited only as claimed.

I claim:

The combination of a box-like member, lamps carried within said member, a cover hingedly mounted upon said member, brackets carried by said member and said cover, screws passing through said brackets and drawing said cover tightly against said member, said cover having a cutaway portion, a transparent plate carried rearwardly of said cutaway portion, clamping means for holding said plate in position, said cover having a flange spaced inwardly from the body of said cover, a license plate positioned between said flange and the body of said cover and having apertures therethrough forming the insignia of said license plate, lugs carried by the lower portion of said license plate, corresponding lugs carried by said box-like body portion and screws passing through said last mentioned lugs, and tending to draw them towards each other.

In testimony that I claim the foregoing I have hereunto set my hand at Milwaukee, in the county of Milwaukee and State of Wisconsin.

PETER JOHN.